United States Patent [19]
Pennock et al.

[11] Patent Number: 5,854,972
[45] Date of Patent: Dec. 29, 1998

[54] CIRCUIT FOR ADJUSTING TRANSMIT POWER

[75] Inventors: Mark A. Pennock, Lake Zurich; David C. Thompson, Grayslake, both of Ill.

[73] Assignee: Motorola, Inc., Schaumburg, Ill.

[21] Appl. No.: 648,847

[22] Filed: May 16, 1996

[51] Int. Cl.$^6$ .............................. H01Q 11/12; H04B 1/04
[52] U.S. Cl. ........................ 455/126; 455/115; 455/127; 343/702
[58] Field of Search .......................... 455/115, 126–127, 455/129, 96, 116; 343/702; H01Q 1/240

[56] References Cited

U.S. PATENT DOCUMENTS

| | | | |
|---|---|---|---|
| 3,969,728 | 7/1976 | Hodsdon et al. | 343/702 |
| 4,709,403 | 11/1987 | Kikuchi | 455/126 |
| 5,086,508 | 2/1992 | Furuno | 455/69 |
| 5,383,223 | 1/1995 | Inokuchi | 375/60 |
| 5,452,473 | 9/1995 | Weiland et al. | 455/88 |
| 5,548,827 | 8/1996 | Hanawa et al. | 455/129 |

OTHER PUBLICATIONS

Kiem et al., "Transmitter Having Adjustable Power Levels Responsive to the Position of a Movable Antenna", U.S.S.N 07/880,918, May 11, 1992 Attorney Docket No. CE00621R.

Thompson et al., "Wireless Communication Device Having a Reconfigurable Matching Circuit", U.S.S.N. 08/577, 460, Dec. 22, 1995 Attorney Docket No. CE01305R.

Black et al., "Wireless Comunication Device with Antenna–Activated Switch", U.S.S.N. 08/614,873, Mar. 13, 1996 Attorney Docket No. CE01905R.

*Primary Examiner*—Andrew I. Faile
*Assistant Examiner*—Vincent F. Boccio
*Attorney, Agent, or Firm*—Donald C. Kordish; Lalita P. Williams

[57] ABSTRACT

A transmitter (135) responds to a first control signal by outputting a transmit signal at a transmit power according to the first control signal. A power-level detector (149) responds to the transmit power by outputting a second control signal representative of a power level of the transmit power. A sensing network (159) is capable of changing from one state to another state in response to a stimulus, for example, the position of a retractable antenna (101) or attachment of a connector (113) or both. The sensing network may modify the second control signal depending upon the state of the sensing circuit. A controller (161) responds to the second control signal, whether modified or not, by determining the first control signal according to the second control signal.

5 Claims, 1 Drawing Sheet

CIRCUIT FOR ADJUSTING TRANSMIT POWER

FIELD OF THE INVENTION

The present invention relates generally to the field of radiotelephones, and more particularly to a circuit for adjusting the transmit power of a radiotelephone. Although the invention is subject to a wide range of applications, it is especially suited for use in portable radiotelephone equipment, and will be particularly described in that connection.

BACKGROUND OF THE INVENTION

A portable radiotelephone and base station are in communication with each other when the portable radiotelephone is within the area covered by the base station. As the radiotelephone moves within the area, its transmit power may require adjustment to maintain adequate communication with the base station. For example, as the radiotelephone moves away from the base station, or an obstruction blocks the communication path between the radiotelephone and base station, the radiotelephone's transmit power may require boosting. The base station monitors the strength of the radiotelephone's transmit power, and sends a signal that informs the radiotelephone to increase its transmit power.

In certain cellular systems, such as the Narrow-band Total Access Communication Service (NTACS) cellular system used in Japan, there are eight transmit power ranges, corresponding to "steps". Steps "0" through "3" have the highest power ranges, and step "7" has the lowest power range. Each step has a specified "nominal" power level, and a power range around the nominal power level. The power range is defined by a highest permissible power level and a lowest permissible power level for each step. The transmit power may fall within the power range of a specified power step. Typically, upon receipt of the signal from the base station specifying the power step at which the radiotelephone should transmit, the radiotelephone's transmit power is adjusted to a single power level within the specified power step, for example, the nominal power level. Thus, each time step 7 is specified, the radiotelephone will transmit at the nominal power level within step 7.

A radio transceiver is known in which the transmit power is adjusted from the single power level of a specified step to another power level within the power range of the specified step. This radio transceiver has the disadvantage of requiring a modification of the existing control logic circuits that decode the specified power step and control the transceiver's transmit power.

A need therefore exists for a circuit for adjusting the transmit power from the single power level to another power level within the power range that does not require the modification of existing control logic circuits, or the software programs, that decode the specified power step and control the transceiver's transmit power.

DETAILED DESCRIPTION OF THE PREFERRED EMBODIMENTS

Figure 1:
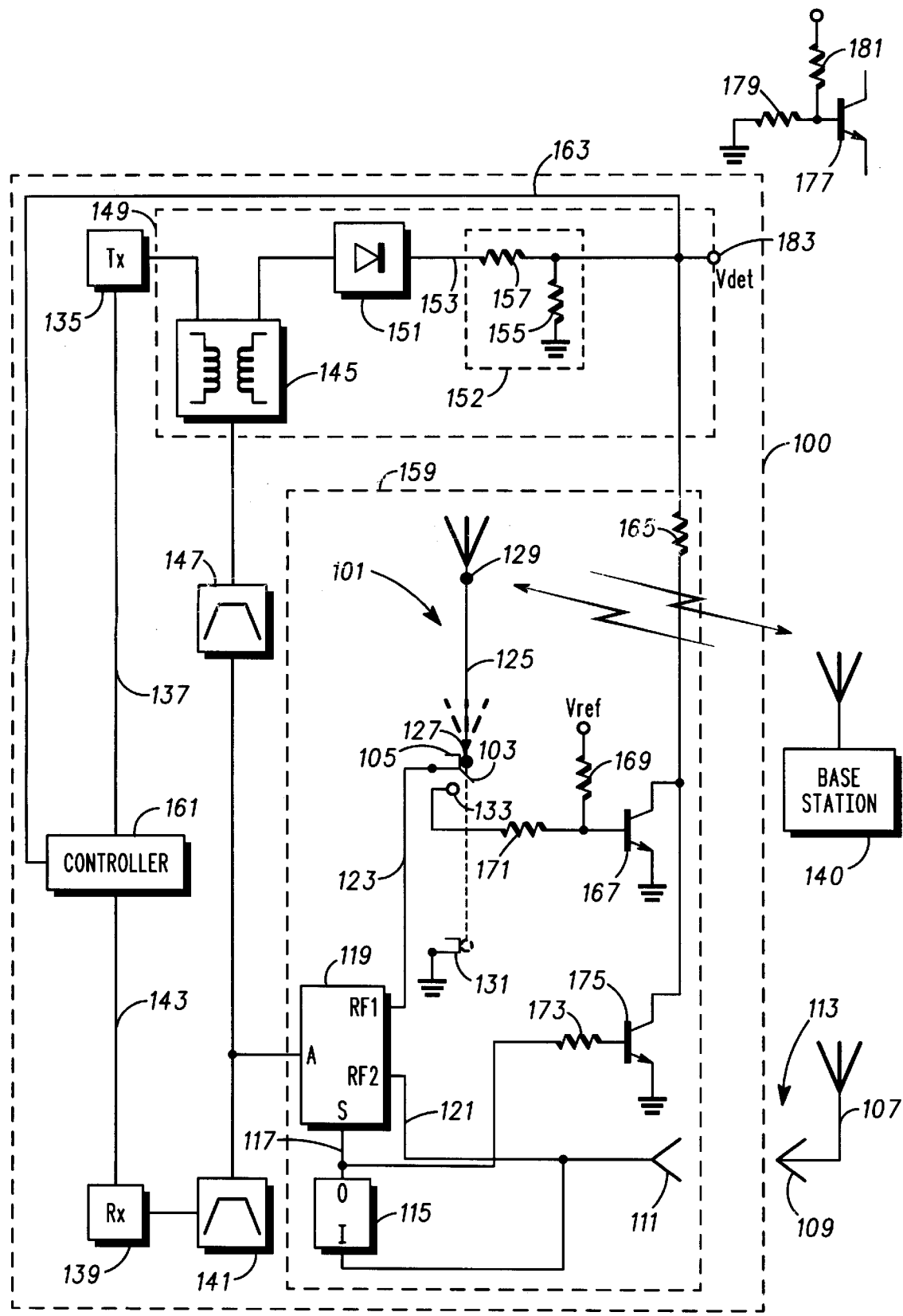
FIG. 1 is a general electric schematic of a radiotelephone.

The radiotelephone described herein provide advantages over known radiotelephones in that a transmit power level of a radiotelephone can be adjusted from a single power level to another power level within a power range without modifying existing control logic circuits, or the software programs, that decode a specified power step and control the transceiver's transmit power.

These advantages over the conventional radiotelephones are principally provided by adjusting a transmit-power detection signal under certain conditions when it is desired to adjust the transmit power.

Reference will now be made in detail to a radiotelephone.

FIG. 1 is a general electric schematic of a radiotelephone 100. A retractable antenna 101 has an extended position, wherein retractable antenna 101 extends outside a housing of radiotelephone 100, and a retracted position, wherein retractable antenna 101 retracts inside the housing. (The positon of retractable antenna 101 in the retracted position is shown in dotted lines.) Retractable antenna 101 has a rod portion 125, with an upper contact 129 near one end and a lower contact 127 near the other end. Upper contact 129 and lower contact 127 are in direct electrical connection via rod portion 125. When in the extended position, lower contact 127 makes direct electrical connection to a feed contact 105; and in the retracted position, lower contact 127 makes direct electrical connection to a ground contact 131, which is coupled to a ground of radiotelephone 100.

A switch 103 is responsive to the extended position and the retracted position of retractable antenna 101. In the extended position, switch 103 is normally open; and in the retracted positon, switch 103 is forced closed by retractable antenna 101. When switch 103 is closed, feed contact 105 is in direct electrical connection with a terminal 133 via the arm of switch 103.

An external antenna 107 can be part of a 3-watt adapter kit, that can allow radiotelephone 100 to transmit and receive through external antenna 107 rather than retractable antenna 101.

A connector 113 comprising a jack 109 and a plug 111 enable external antenna 107 to be connected with radiotelephone 100. Jack 109 is part of the adapter kit, and plug 111 is part of radiotelephone 100. A sensor 115 is coupled to plug 111 and senses the connection of jack 109 to plug 111.

A radio-frequency (RF) switch 119 is coupled to sensor 115 via a line 117. RF switch 119 is coupled to plug 111 via a line 121, and is coupled to feed contact 105 via a line 123. RF switch 119 switches between retractable antenna 101 and external antenna 107 depending upon the connection of jack 109 to plug 111.

Retractable antenna 101, the integral switch 103 and feed contact 105, plug 111, sensor 115, and RF switch 119 have been used in the StarTAC™ cellular phone that is available from Motorola, Inc., and these components and their operation are readily understood by one of ordinary skill in the art. (StarTAC is a trademark of Motorola, Inc.)

Radiotelephone 100 communicates with a base station 140 by way of wireless communication. Radiotelephone 100 sends a transmit signal at a transmit power to base station 140, and base station 140 determines whether the transmit power needs to be increased. Base station 140 sends to radiotelephone 100 a return signal specifying a power step representing a power range for the transmit power. Either retractable antenna 101 or external antenna 107 receives the return signal, which is in turn received by a receiver 139 of radiotelephone 100 via RF switch 119 and a filter 141 tuned to the frequency of the return signal. Receiver 139 demodulates the signal, and outputs the demodulated signal on a line 143.

A transmitter 135 of radiotelephone 100 outputs the transmit signal at the transmit power specified by a control signal on a line 137. The outputted transmit signal passes through a coupler 145, a filter 147 tuned to the frequency of the transmit signal, RF switch 119, and either retractable antenna 101 or external antenna 107.

A power-level detector 149 is coupled to the transmitter 135, and detects the transmit power by way of coupler 145. Coupler 145 couples a small portion of voltage of the outputted transmit signal to a rectifier 151, which rectifies the small portion of voltage and outputs the rectified voltage on a line 153. A voltage-divider network 152 comprises a series resistor 157 coupled to rectifier 151 and a detector resistor 155 coupled to series resistor 157 and ground. The rectified voltage is divided between series resistor 157 and detector resistor 155. A detector voltage ($V_{det}$) across detector resistor 155 is proportional to the transmit power of the outputted transmit signal, and is applied to a port 183.

The detector voltage is fed back to a controller 161 of radiotelephone 100 via a line 163. Controller 161 controls the transmitter's generation of the transmit power according to the detector voltage and the specified power step, which is contained in the demodulated signal. Controller 161 receives the specified power step and the detector voltage, determines a transmit-power level according to the specified power step and the detector voltage, and outputs the control signal representative of the determined transmit-power.

One of ordinary skill in the art would know how to control the transmit power according to the detector voltage and the specified power step. For example, a lookup table can be stored in controller 161 that provides a comparison voltage for each specified power step. The comparison voltage is a voltage value that the detector voltage should be at when the transmit power is at a predetermined power level within the power step, e.g., the nominal power level. When the difference between the comparison voltage and the detected voltage is greater than zero, controller 161 generates a control signal that instructs transmitter 135 to increase the transmit power level. The increased transmit power in turn increases the detector voltage, and the transmit power is increased until the detector voltage equals the comparison voltage. At that point, the transmit power is at the nominal power level of the specified power step.

A sensing network 159 is coupled to the power-level detector in a parallel configuration, and is capable of modifying the detector voltage by changing from one state to another state. In one state, the detector voltage is not modified; in another state, the detector voltage is modified. Sensing network 159 includes at least one sensing circuit capable of changing sensing network 159 from one state to another state. For example, a first sensing circuit could comprise the previously described retractable antenna 101, switch 103 including terminal 133, feed contact 105, and ground contact 131, as well as a transistor 167, a shunt resistor 165 coupled between detector resistor 155 and the collector of transistor 167, a resistor 169 coupled to the base of transistor 167, and a resistor 171 coupled between terminal 133 and the base of transistor 167. A positive voltage $V_{ref}$ is applied to resistor 169. A transistor in this configuration can function as a switch.

This first sensing circuit is responsive to the extended position and the retracted position of retractable antenna 101. The first sensing circuit couples shunt resistor 165 to detector resistor 155 in a parallel connection when the antenna is in the extended position. In the extended position, positive voltage is applied to the base to turn transistor 167 ON, which in turn couples shunt resistor 165 to ground. When retractable antenna 101 is retracted, switch 103 is closed and a conductive path for direct-current signals is formed between terminal 133 and ground contact 131, thus placing terminal 133 at ground potential. Consequently, by proper selection of resistors 169,171, the voltage applied to the base of transistor 167 is not sufficient to turn the transistor ON, thus transistor 167 is OFF. Consequently, shunt resistor 165 is no longer in parallel connection to detector resistor 155.

The ability to switch shunt resistor 165 in and out of parallel connection with detector resistor 156 has important consequences on the value $V_{det}$, and ultimately on the transmit power. In fact, the ability to modify $V_{det}$ as a function of the state of sensing network 159 enables radiotelephone 100 to send transmit signals at different power levels within the power range of a specified step. An example will illustrate this principle.

Assume retractable antenna 101 is in the extended position. Thus, transistor 167 is ON and shunt resistor 165 is in parallel connection to detector resistor 155. Also assume that $V_{det}$ is at a value that causes transmitter 135 to output a transmit signal at a transmit power that is equal to the nominal power level corresponding to a specified power step. When retractable antenna 101 is then retracted, transistor 167 turns OFF and thus shunt resistor 165 is no longer in parallel connection to detector resistor 155. Consequently, given the proper values of resistance for series resistor 157, detector resistor 155, and shunt resistor 165, $V_{det}$ is modified, i.e., increased an appreciable amount due to the value of resistance for detector resistor 155 alone being larger than the combined resistance of the parallel connected detector resistor 155 and shunt resistor 165. Because $V_{det}$ is increased, controller 161 now determines (although incorrectly) that the transmit power is exceeding the nominal power level, and sends a control signal to transmitter 135 to reduce the power level. Transmit power is reduced until the modified $V_{det}$ again equals the initial value of $V_{det}$ before shunt resistor 165 was switched out. When the initial value of $V_{det}$ is reached, controller 161 determines that transmit power is at the nominal power level, when in fact it is at a reduced power lever. Through knowledge of the power ranges and parameters of the particular radiotelephone 100, one of ordinary skill in the art could determine the resistor values necessary to obtain a modified $V_{det}$ that would produce a reduced transmit power level that lies within the power range of the specified power step. Consequently, two different power levels within a power range can be obtained without modification of existing control logic circuits, or the software programs, that decode the specified power step and control the transceiver's transmit power.

Another example will further illustrate the way radiotelephone 100 can transmit at different power levels within the same power step. Receiver 139, transmitter 135, and controller 161 can constitute a transceiver of radiotelephone 100. The transceiver is responsive to $V_{det}$ and the return signal specifying the power step. In response to these two control signals, the transceiver outputs the transmit signal at a transmit power according to $V_{det}$ and the specified power step. Rectifier 151 outputs a rectified voltage that is proportional to the power level of the transmit power, and voltage-divider network 152, which represents a gain circuit, applies a multiplying factor to the rectified voltage. Sensing network 159, which is a gain-modifying circuit, changes the multiplying factor, e.g., by coupling shunt resistor 165 to detector resistor 155 in a parallel connection.

Sensing network 159 can alternatively include a second sensing circuit, or can include both a first sensing circuit and a second sensing circuit capable of changing sensing network 159 from one state to another state. The second sensing circuit will be described as used in tandem with the first sensing circuit. The second sensing circuit could comprise the previously described RF switch 119, sensor 115, and plug 111, as well as a transistor 175 and a resistor 173 coupled between an output terminal of sensor 115 and the base of transistor 175. Further, the collector of transistor 175 is coupled to the collector of transistor 167 and shunt resistor 165.

This second sensing circuit is responsive to the attachment of jack 109 to plug 111. The second sensing circuit couples shunt resistor 165 to detector resistor 155 in a parallel connection when the external antenna is attached to the radiotelephone. When there is no connection of jack 109 to plug 111, an output terminal (O) of sensor 115 outputs a negative voltage, which is applied to line 117. Consequently, transistor 175 is OFF. When sensor 115 senses the attachment of jack 109 to plug 111 via an input terminal (I), the voltage at the output terminal changes from a negative voltage to a positive voltage. Thus transistor 175 is turned ON from OFF, which couples shunt resistor 165 to ground.

This particular embodiment of sensing network 159 causes the transmit power to be reduced only when external antenna 107 is not connected and retractable antenna 101 is down.

Also illustrated in FIG. 1 is a transistor 177 and associated resistors that when coupled properly to power-level detector 149 and sensing network 159 provides a feature that disables the adjustment of the transmit power for power steps in the lower power range. A transistor 177 is placed between shunt resistor 165 and the other transistors 167,175, by uncoupling the connection between shunt resistor 165 and the collector of transistor 167, and by coupling the collector of transistor 177 to shunt resistor 165 and the emitter of transistor 177 to the collectors of the other transistors. The base of transistor 177 is coupled with a resistor 179 that is coupled with ground; and the base is also coupled with the output of rectifier 151 via a resistor 181. The values of resistors 171,181 are chosen such that transistor 177 is turned OFF for certain lower power steps, which are reflected in the voltage at the output of rectifier 151, and ON for the remaining higher power steps. When transistor 177 is OFF, transistors 167,171 are unable to couple shunt resistor 165 to ground.

Those skilled in the art will recognize that various modifications and variations can be made in the circuit of the present invention and in construction of the radiotelephone without departing from the scope or spirit of this invention. As examples, stimulus other than antenna position or plug connection may be sensed to change the state of sensing network 159; and other means may be used to modify the detector voltage upon a change of state.

In summary, a radiotelephone has been described that provides advantages over known radiotelephones in that a transmit power level of a radiotelephone can be adjusted from a single power level to another power level within a power range without modifying existing control logic circuits, or the software programs, that decode a specified power step and control the transceiver's transmit power. Rather, a detector voltage, which is used by the controller that generates the signal that determines the transmit power, is modified under certain conditions when it is desired to adjust the transmit powers

What is claimed is:

1. A radiotelephone comprising:
   a transmitter, responsive to a first control signal, for outputting a transmit signal at a transmit power according to the first control signal:
   a power-level detector, comprising a first resistor, responsive to the transmit power, and outputting a second control signal which represents a voltage across the first resistor and a power level of the transmit power;
   a sensing network capable of changing from one state to another state in response to a stimulus, the sensing network comprising a second resistor and a switch having an open position and a closed position coupled in a series connection with the second resistor, wherein the switch couples the second resistor to the first resistor in a parallel connection when the switch is in the closed position, and wherein the sensing network modifies the second control signal output from the power-level detector according to the state of the sensing network: and
   a controller, responsive to the second control signal, for determining the first control signal according to the second control signal.

2. The radiotelephone of claim 1 wherein the controller is further responsive to a third control signal specifying a power step representing a power range for the transmit power, and further for determining the first control signal according to the second control signal and the third control signal.

3. A sensing circuit for adjusting a transmit power of a radiotelephone, the radiotelephone including a power-level detector having a port outputting a detector voltage that is proportional to a power level of the transmit power, the detector voltage supplied to a controller of the radiotelephone that controls the transmit power according to the detector voltage, the sensing circuit comprising:
   a shunt resistor coupled with the port;
   a first single switch having one open position and one closed position coupled in series with the shunt resistor; and
   a retractable antenna coupled to the radiotelephone having an extended position and a retracted position, wherein when the antenna is retracted to the retracted position, the first single switch opens thereby causing the detector voltage to increase and the transmit power to decrease, and wherein when the first single switch closes, the shunt resistor is coupled to a ground.

4. The sensing circuit of claim 3 wherein the radiotelephone has a plug for receiving a jack of an external antenna inserted into the plug, wherein a second single switch, responsive to insertion of the jack into the plug, is in the closed position when the jack is inserted into the plug.

5. A radiotelephone comprising:
   a transmitter for outputting a transmit power of the radiotelephone;
   a power-level detector including a rectifier outputting a rectified voltage that is proportional to a power level of the transmit power, and a voltage-divider network including a detector resistor to which a portion of the rectified voltage is applied;
   a shunt resistor coupled in a parallel configuration with the detector resistor;
   a first switch, coupled in series with the shunt resistor, having an open position and a closed position and responsive to the rectified voltage; and
   a second switch, coupled in series with the first switch, having an open position and a closed position, wherein when the first switch is in the open position, indicative of the rectified voltage below a predetermined value, the second switch is disabled thereby preventing adjustment of the transmit power, and wherein when the first switch is in the closed position, indicative of the rectified voltage exceeding a predetermined value, the second switch is enabled thereby allowing adjustment of the transmit power.

* * * * *